United States Patent
Han et al.

(10) Patent No.: US 9,269,356 B2
(45) Date of Patent: Feb. 23, 2016

(54) METHOD AND APPARATUS FOR RECOGNIZING SPEECH ACCORDING TO DYNAMIC DISPLAY

(75) Inventors: Ick-Sang Han, Yongin-si (KR); Jeong-Mi Cho, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1051 days.

(21) Appl. No.: 12/844,898

(22) Filed: Jul. 28, 2010

(65) Prior Publication Data

US 2011/0029301 A1    Feb. 3, 2011

(30) Foreign Application Priority Data

Jul. 31, 2009    (KR) .................... 10-2009-0070833

(51) Int. Cl.
*G10L 15/00*    (2013.01)
*G10L 15/04*    (2013.01)
(Continued)

(52) U.S. Cl.
CPC ............ *G10L 15/24* (2013.01); *G06F 3/04845* (2013.01); *G06F 3/147* (2013.01); *G06F 3/167* (2013.01); *G09G 3/34* (2013.01); *G09G 5/14* (2013.01); *B60R 16/0373* (2013.01); *G01C 21/3608* (2013.01); *G09G 2340/04* (2013.01);
(Continued)

(58) Field of Classification Search
CPC ..... B60R 16/0373; G10L 15/00; G10L 15/18; G10L 15/183; G10L 15/1815; G10L 15/22; G10L 15/24; G10L 15/26; G10L 15/265; G10L 2015/00; G10L 2015/222; G10L 2015/225; G10L 2015/223; G10L 2015/226; G10L 2015/228; A63F 13/00; G09B 19/04; G06F 3/16; G01C 21/3608

USPC .............. 704/9, 10, 231, 235, 236, 251, 252, 704/255, 257; 701/200, 211, 212, 208, 213, 701/1
See application file for complete search history.

(56) References Cited

U.S. PATENT DOCUMENTS 5,995,918 A * 11/1999 Kendall et al. .................... 704/1
6,112,174 A    8/2000 Wakisaka et al.
(Continued)

FOREIGN PATENT DOCUMENTS

| JP | 2001-249686 | 9/2001 |
| JP | 2004-133880 | 4/2004 |

(Continued)

OTHER PUBLICATIONS

Korean Office Action mailed on Jun. 12, 2015 in counterpart Korean Application No. 10-2009-0070833 (5 pages in Korean, 3 pages in English).

*Primary Examiner* — Paras D Shah
(74) *Attorney, Agent, or Firm* — NSIP Law

(57) ABSTRACT

A speech recognition apparatus and method that can improve speech recognition rate and recognition speed by reflecting information for dynamic display, are provided. The speech recognition apparatus generates a display variation signal indicating that variations have occurred on a screen and creates display information about the varied screen. The speech recognition apparatus adjusts a word weight for at least one word related to the varied screen and a domain weight for at least one domain included in the varied screen, according to the display variation signal and the display information. The adjusted word weight and the adjusted domain weight are dynamically reflected in a language model that is used for speech recognition.

21 Claims, 17 Drawing Sheets

(51) Int. Cl.

| | | |
|---|---|---|
| *G10L 15/24* | (2013.01) | |
| *G06F 3/0484* | (2013.01) | |
| *G06F 3/147* | (2006.01) | |
| *G06F 3/16* | (2006.01) | |
| *G09G 3/34* | (2006.01) | |
| *G09G 5/14* | (2006.01) | |
| *G10L 15/26* | (2006.01) | |
| *G01C 21/36* | (2006.01) | |
| *B60R 16/037* | (2006.01) | |

(52) U.S. Cl.
CPC ........ *G09G 2340/045* (2013.01); *G10L 15/265* (2013.01)

(56) References Cited

U.S. PATENT DOCUMENTS

| | | | |
|---|---|---|---|
| 6,192,343 B1* | 2/2001 | Morgan et al. | 704/275 |
| 6,999,874 B2* | 2/2006 | Seto et al. | 701/539 |
| 7,143,035 B2 | 11/2006 | Dharanipragada et al. | |
| 7,206,747 B1 | 4/2007 | Morgan et al. | |
| 7,308,404 B2 | 12/2007 | Venkataraman et al. | |
| 7,437,296 B2* | 10/2008 | Inoue et al. | 704/275 |
| 7,555,725 B2* | 6/2009 | Abramson et al. | 715/781 |
| 7,742,923 B2* | 6/2010 | Bickel et al. | 704/275 |
| 8,078,467 B2* | 12/2011 | Wu et al. | 704/270 |
| 2003/0036907 A1* | 2/2003 | Stewart et al. | 704/271 |
| 2003/0125869 A1* | 7/2003 | Adams, Jr. | 701/200 |
| 2003/0204399 A1 | 10/2003 | Wolf et al. | |
| 2004/0249632 A1* | 12/2004 | Chacon | 704/9 |
| 2005/0055210 A1 | 3/2005 | Venkataraman et al. | |
| 2005/0055218 A1* | 3/2005 | Julia et al. | 704/277 |
| 2005/0102141 A1* | 5/2005 | Chikuri | 704/244 |
| 2005/0182628 A1 | 8/2005 | Choi | |
| 2006/0106610 A1* | 5/2006 | Napper | 704/270 |
| 2007/0005371 A1* | 1/2007 | Nakagawa et al. | 704/275 |
| 2007/0033043 A1* | 2/2007 | Hyakumoto | 704/255 |
| 2007/0100618 A1* | 5/2007 | Lee et al. | 704/238 |
| 2007/0233487 A1* | 10/2007 | Cohen et al. | 704/255 |
| 2008/0133238 A1* | 6/2008 | Yamamoto et al. | 704/251 |
| 2008/0201148 A1 | 8/2008 | Desrochers | |
| 2009/0240668 A1* | 9/2009 | Li | 707/3 |
| 2009/0292540 A1* | 11/2009 | Liu et al. | 704/251 |
| 2010/0312469 A1* | 12/2010 | Chen | 701/207 |
| 2011/0022393 A1* | 1/2011 | Waller et al. | 704/270 |

FOREIGN PATENT DOCUMENTS

| | | |
|---|---|---|
| JP | 2007-017731 | 1/2007 |
| JP | 2007-280364 A | 10/2007 |
| KR | 10-2000-0067827 | 11/2000 |
| KR | 10-2005-0082249 A | 8/2005 |

* cited by examiner

FIG.5B

| ADDRESS | RECEPTION TIME | DISPLAY INFORMATION |
|---|---|---|
| T | TIME(T) | info(T) |
| 2 | TIME(2) | info(2) |
| 1 | TIME(1) | info(1) |

FIG.7B

| WEIGHT | SCREEN | WORD |
|---|---|---|
| 0.5 | t | Gyeongbokgung Gyotaejeon, Kogsuji, National Folk museum, Taewonjeon, ... |
| 0.4 | t-1 | Gyeonghuigung, Sungjeongjeon, ... |
| | ZOOM-IN | Gyeonghoeru, Gangnyongjeon, ... |
| | ZOOM-OUT | Gyeongbokgung Station, ... |
| | OUTER | Royal Museum, ... |

FIG.10B

| WEIGHT | t1 | t2 |
|---|---|---|
| 0.5 | d | e |
| 0.4 | e | d |
| 0.3 | c | c |
| 0.2 | b | b |
| 0.1 | a | a |

FIG.11B

| No. | X COORDINATE | Y COORDINATE | WORD id |
|---|---|---|---|
| ... | \multicolumn{2}{MAGNIFICATION LEVEL : 8} | |
| 21 | 3.10 | 5.40 | JIPOKJAE |
| 22 | 3.11 | 5.51 | KUNCHUNGGUNG |
| 23 | 3.25 | 5.35 | TAEWONJEON |
| 24 | 3.35 | 5.75 | NATIONAL FOLK MUSEUM |
| 25 | 3.46 | 5.62 | KOGSUJI |
| 26 | 3.55 | 5.55 | GYOTAEJEON |
| 27 | 3.63 | 5.55 | GYEONGBOKGUNG |
| 28 | 3.71 | 5.23 | DAELIM ART MUSEUM |
| 29 | 3.72 | 5.82 | DONGJEONGMUN |
| ... | | | |

FIG.12B

| No. | UL:x | UL:y | LR:x | LR:y | DOMAIN id |
|---|---|---|---|---|---|
| ... | MAGNIFICATION LEVEL : 8 | | | | |
| 11 | 9.05 | 7.44 | 9.85 | 8.30 | a |
| 12 | 9.15 | 7.21 | 9.53 | 7.92 | b |
| 13 | 9.21 | 7.54 | 9.65 | 7.99 | c |
| 14 | 9.30 | 7.61 | 9.45 | 7.70 | d |
| 15 | 9.30 | 7.85 | 9.36 | 7.90 | e |
| 16 | 9.65 | 7.22 | 9.85 | 7.33 | f |
| ... | | | | | |
| ... | MAGNIFICATION LEVEL : 7 | | | | |
| 5 | 9.05 | 7.44 | 9.85 | 8.30 | a |
| 6 | 9.15 | 7.21 | 9.53 | 7.92 | b |
| 7 | 9.21 | 7.54 | 9.65 | 7.99 | c |
| 8 | 9.65 | 7.22 | 9.85 | 7.33 | f |
| ... | | | | | |

METHOD AND APPARATUS FOR RECOGNIZING SPEECH ACCORDING TO DYNAMIC DISPLAY

CROSS-REFERENCE TO RELATED APPLICATION(S)

This application claims the benefit under 35 U.S.C. §119(a) of Korean Patent Application No. 10-2009-0070833, filed on Jul. 31, 2009, the entire disclosure of which is incorporated herein by reference for all purposes.

BACKGROUND

1. Field

The following description relates to an apparatus and method for speech recognition, and more particularly, to a speech recognition apparatus and method that allows a user to input vocal commands to manipulate a display.

2. Description of the Related Art

Recently, applications, such as three-dimensional simulations or games are becoming more popular. Users may search for desired information directly or indirectly while viewing the application on a display. The display on which such an application is executed may have a dynamic structure that varies over time or according to a user's manipulations. While viewing the dynamic display, a user tends to concentrate his or her efforts on execution of the application. Accordingly, a speech recognition method may be useful to allow the user to interact with the display without the use of focusing his or her attention on inputting commands via a keyboard or via a touch screen.

SUMMARY

In one general aspect, there is provided a speech recognition apparatus, including: a controller configured to: generate a display variation signal indicating that variations have occurred on a screen, and create display information about the varied screen, and a speech recognizer configured to: adjust a word weight for at least one word related to the varied screen and a domain weight for at least one domain included the varied screen, according to the display variation signal and the display information, and perform speech recognition using a dynamic language model in which the adjusted word weight and the adjusted domain weight are reflected.

The speech recognition apparatus may further include that the controller is further configured to generate the display variation signal in response to a user input signal.

The speech recognition apparatus may further include that the user input signal is generated by at least one of: cursor movement, magnification adjustment, and screen rotation.

The speech recognition apparatus may further include that the controller is further configured to generate the display variation signal when a moving object appears on the varied screen.

The speech recognition apparatus may further include that the speech recognizer is further configured to perform the speech recognition using a language model where greater word weights and greater domain weights are respectively assigned to words and domains associated with a current screen.

The speech recognition apparatus may further include that the speech recognizer is further configured to: recognize the at least one word related to the varied screen using a linguistic structure that provides at least one associated word according to coordinates and magnifications of screens, recognize the at least one domain included in the varied screen using a domain structure configured to provide at least one associated domain according to coordinates and magnifications of screens, and adjust the word weight for the at least one word and the domain weight for the at least one domain.

The speech recognition apparatus may further include that the display information about the varied screen includes at least one of: a coordinate range of the varied screen, a magnification level, a word related to the varied screen, and a domain belonging to the varied screen.

The speech recognition apparatus may further include that the speech recognizer includes: a display information manager configured to manage the storage of display information that varies over time, a weight adjusting unit configured to adjust word weights and domain weights according to variations of the display information, and a speech recognition engine configured to: acquire the adjusted word weights and the adjusted domain weights when an utterance is input, and perform speech recognition using a language model generated dynamically according to the acquired word weights and the acquired domain weights.

The speech recognition apparatus may further include that the display information manager is further configured to determine whether or not to store the display information based on at least one of: a difference between a time at which the display variation signal has been received and a time at which the previous display variation signal has been received, variations in coordinate range between a current screen and the previous screen, and whether or not speech recognition has been performed on a screen.

The speech recognition apparatus may further include that the weight adjusting unit is further configured to assign a greater word weight to at least one word included in a current screen and screens adjacent temporally and spatially to the current screen in comparison to words that are not included in the current screen and the adjacent screens.

The speech recognition apparatus may further include that the weight adjusting unit is further configured to: assign a greater domain weight to at least one domain included in a current screen and screens adjacent temporally and spatially to the current screen in comparison to domains not included in the current screen and the adjacent screens, and assign a greater domain weight to at least one domain having a greater portion overlapping the current screen and at least one domain having a shorter distance to a center of the current screen.

The speech recognition apparatus may further include that the dynamic language model is calculated by interpolating a general language model that covers all domains, a domain language model defined for each domain, and a word language model in which word weight information is reflected.

In another general aspect, there is provided a speech recognition method, including: generating a display variation signal indicating that variations have occurred on a screen and creating display information about the varied screen, adjusting a word weight for at least one word related to the varied screen and a domain weight for at least one domain included in the varied screen, according to the display variation signal and the display information, and performing speech recognition using a dynamic language model in which the adjusted word weight and the adjusted domain weight are reflected.

The speech recognition method may further include that the display variation signal is generated in response to a user input signal.

The speech recognition method may further include that the user input signal is generated by at least one of: cursor movement, magnification adjustment, and screen rotation.

The speech recognition method may further include that the display variation signal is generated when a dynamically moving object appears on the varied screen.

The speech recognition method may further include that the performing of the speech recognition includes performing the speech recognition using a language model where greater word weights and greater domain weights are respectively assigned to words and domains associated with a current screen.

The speech recognition method may further include that the adjusting of the word weight includes assigning a greater word weight to at least one word included in a current screen and screens adjacent temporally and/or spatially to the current screen in comparison to words that are not included in the current screen and the adjacent screens.

The speech recognition method may further include that the adjusting of the word weight includes: assigning a greater domain weight to at least one domain included in a current screen and screens adjacent temporally and spatially to the current screen in comparison to domains not included in the current screen and the adjacent screens, and assigning a greater domain weight to at least one domain having a greater portion overlapping the current screen and at least one domain having a shorter distance to a center of the current screen.

The speech recognition method may further include that the dynamic language model is calculated by interpolating a general language model that covers all domains, a domain language model defined for each domain, and a word language model in which word weight information is reflected.

Other features and aspects may be apparent from the following description, the drawings, and the claims.

BRIEF DESCRIPTION OF THE DRAWINGS

FIG. 5B is a diagram illustrating an example of stored display information history.

FIG. 7B is a table illustrating an example of words that are stored with adjusted word weights.

FIG. 10B is a table illustrating an example of domain weights with respect to displays.

FIGS. 11A and 11B are diagrams illustrating examples of a linguistic structure.

FIGS. 12A and 12B are diagrams illustrating examples of a domain structure.

Throughout the drawings and the description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Various changes, modifications, and equivalents of the methods, apparatuses, and/or systems described herein may be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

Figure 1:
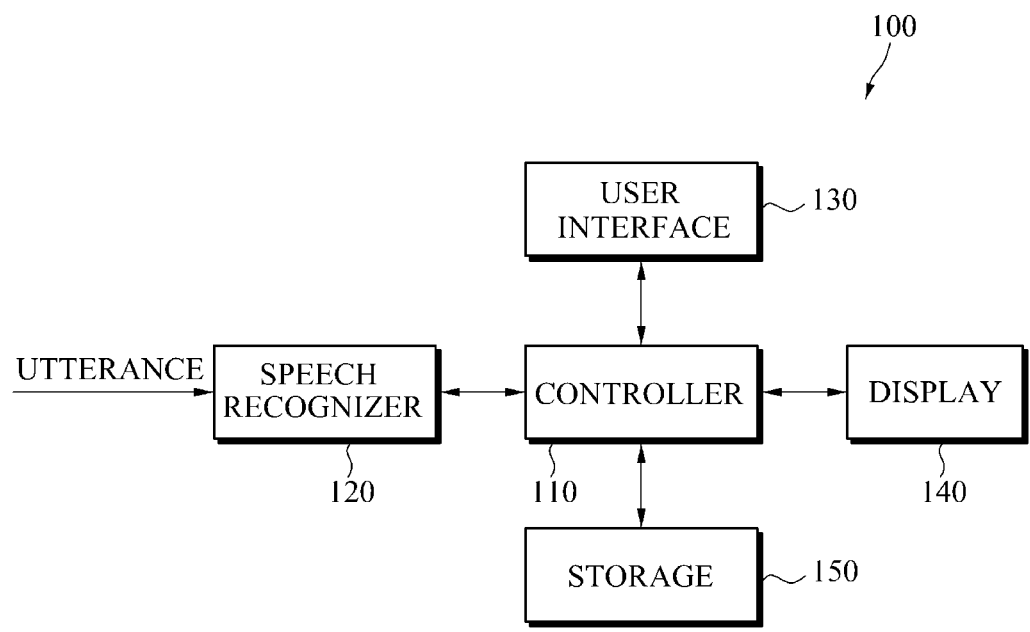
FIG. 1 is a diagram illustrating an example of a speech recognition apparatus.

FIG. 1 illustrates an example of a speech recognition apparatus.

Referring to FIG. 1, speech recognition apparatus 100 includes a controller 110, a speech recognizer 120, a user interface 130, a display 140, and a storage 150. The speech recognition apparatus 100 may be installed in a terminal, for example, a mobile phone, a notebook computer, a desktop computer, consumer electronics, and the like.

The speech recognition apparatus 100 may process utterances that may be used to manipulate a screen or objects on the screen, in response to dynamic variations of display. For example, the objects may include background environments statically displayed on the screen, avatars moving dynamically on the screen, and the like. The objects are not limited in kind and form. The objects are associated with words included in a language model that is designated for speech recognition. To process the utterances, the speech recognition apparatus 100 creates a language model based on display information. The language model may be created and updated dynamically over time.

The controller 110 controls the operation of the speech recognition apparatus 100 by communicating with the speech recognizer 120, the user interface 130, the display 140, and the storage 150. The controller 110 may control an application execution screen, and also create display information regarding the application execution. The controller 110 may also generate a display variation signal that includes information on screen variations.

The display information may include a coordinate range and magnification level of a currently displayed screen, at least one word associated with the currently displayed screen, and at least one domain belonging to the currently displayed screen.

The coordinate range may be represented, for example, as a 2-dimensional map that includes an upper-left coordinate (x, y) and a lower-right coordinate (x, y). However, a representation of the coordinate range is not limited to this. The magnification level may be, for example, a scale level of the current screen, which changes upon zooming in/out. Information about at least one word and at least one domain associated with the current screen may be dynamically created when the controller 110 executes an application. Information regarding the word and domain associated with the current screen may be used to dynamically process moving objects, and also may be created in association with static objects.

For example, the word may be the name of a place on a map or the name of an object that is displayed on the screen such as the name of a city or the name of a person. Also, the word may include tag information related to objects being managed virtually by the speech recognition apparatus 100 even if the names of the objects do not appear on the screen. Accordingly, words designated in advance in association with objects that do not appear on the screen, as well as words displayed as text on the screen, may become objects having weights. The weights include attributes of the words which are variable, in order to display variations of the words.

The domain is a region on the screen and may include a group of words that can be recognized as being associated with each other. For example, in a map system, a domain may be a broad geographical region, such as the national capital region, or may be a travel domain, a restaurant domain, and the like. Also, domains may be arbitrarily extended in a range of objects.

A specific region may be defined as a domain if the region has a dependent language model. For example, in a scene where an avatar enters the Colosseum in Rome and watches gladiators, the screen may include a Rome domain, a Colosseum domain, and a gladiator domain. In another example, when a character appears in a virtual world, the character may be classified into a domain if there is a language model for the character. Accordingly, if domains extend to very small units, frequent domain variations will occur as well as word variations, along with slight display variations.

As described above, the information regarding the word and domain associated with the current screen may be created and controlled by the controller 110. The controller 110 may acquire word information or domain information from the tag information associated with objects displayed on the screen. The controller 110 may recognize objects displayed on a screen using a known object recognition algorithm, and may acquire word information or domain information for the recognized objects.

The speech recognizer 120 may adjust a word weight for at least one word associated with the current screen and a domain weight for at least one domain included in the current screen. The adjusting may be performed according to the display variation signal and display information. The speech recognizer 120 may perform speech recognition using a dynamic language model in which the adjusted word weight and domain weight are reflected. Adjusting weights includes assigning weights and/or updating existing weights. The speech recognizer 120 may perform the speech recognition using a language model in which greater weights are assigned to words and domains related to the current screen than the weights assigned to words and domains not related to the current screen. The words and domains related to the current screen include words and domains included in the screen and words and domains related to screens adjacent spatially or temporally to the current screen.

The results of the speech recognition are transferred to the controller 110, and the controller 110 may reflect the results of the speech recognition to the operation of the application from which the display variation signal has been generated. The execution of the application may be output to the display 140.

The controller 110 may generate the display variation signal when an object dynamically appears on the screen. The display variation signal may be generated by the controller 110 when a user input signal is input to the user interface 130. For example, the display variation signal may be generated by the controller 110 when the controller 110 receives a user input signal generated by user manipulation such as cursor movement, screen manipulation, adjustment of magnification level, screen rotation, and the like.

The user interface 130 may include a keypad and/or a touch pad to receive various user input signals and transfer them to the controller 110. The controller 110 may control application execution according to user input signals.

The storage 150 stores an operating system (OS) for the speech recognition apparatus 100. The storage 150 also stores applications, acoustic models, and language models that may each be used for speech recognition. The storage 150 may be configured to be accessed by the controller 110 and the speech recognizer 120.

Instead of switching language models with respect to several categories that are used by the user, the speech recognition apparatus 100 reflects changes in screens or objects that continue to be varied by screen movement, screen zooming in/out, changes in the direction of view of a user's eyes, and the like, to a language model. The words in the language model may not have the same recognition probability. For example, the recognition probabilities of words displayed on the current screen may be greater than recognition probabilities of words neither related to the current screen nor concerned by a user. Accordingly, by using a language model in which words related to a current screen have greater recognition probabilities, an accuracy of speech recognition and a recognition speed may be improved.

Figure 2:
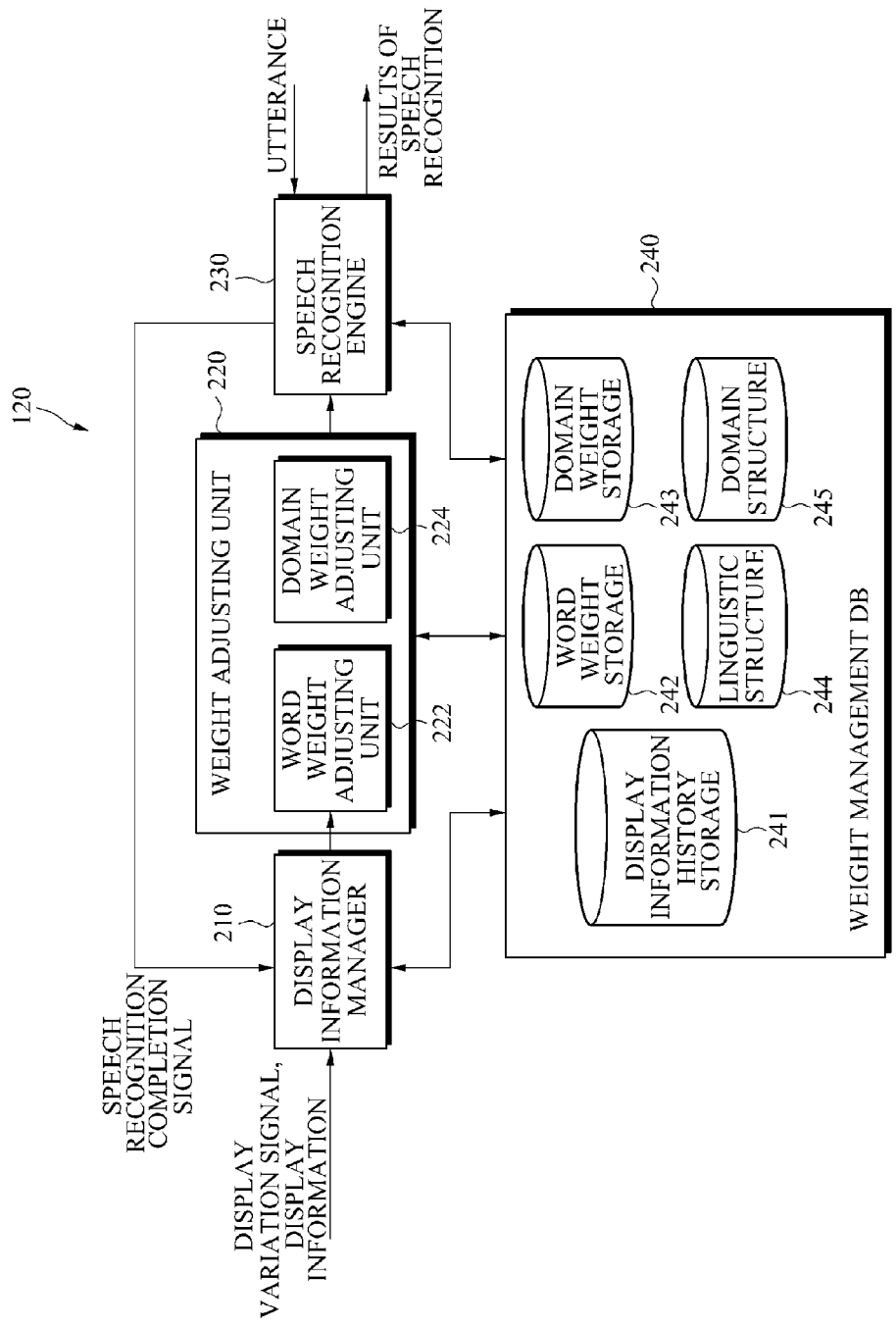
FIG. 2 is a diagram illustrating an example of a speech recognizer that may be included in a speech recognition apparatus.

FIG. 2 illustrates an example of a speech recognizer that may be included in a speech recognition apparatus.

Referring to FIG. 2, speech recognizer 120 includes a display information manager 210, a weight adjusting unit 220, a speech recognition engine 230, and a weight management database (DB) 240. The weight adjusting unit 220 includes a word weight adjusting unit 222 for adjusting a weight of each word, and a domain weight adjusting unit 224 for adjusting a weight of each domain. The weight management DB 240 includes a display information history storage 241, a word weight storage 242, a domain weight storage 243, a linguistic structure 244, and a domain structure 245.

The display information manager 210 manages storage of display information that varies over time. When receiving the display variation information or receiving a speech recognition completion signal from the speech recognition engine 230, the display information manager 210 may store the display information of the corresponding screen in the display information history storage 241. In some embodiments, instead of storing all display information at the time of receiving the display information, only valid display information considered to be of concern to a user may be stored in the display information history storage 241.

If the time from receiving the previous display variation signal exceeds a predetermined threshold or if a coordinate range variation between the current and previous screens exceeds a predetermined threshold, the display information manager 210 may decide a screen corresponding to the previous display variation signal is a valid screen. Alternatively, the display information manager 210 may decide a screen for which speech recognition has been performed, regardless of the time period between the previous and current display variation signals or the coordinate range variation, is a valid screen. The display information manager 210 may store display information of a screen determined to be a valid screen in the display information history storage 241.

When receiving a coordinate range and a magnification level as display information, the display information manager 210 may decide which words and domains to be statically displayed on the current screen, according to the coordinate range and magnification level. The display information manager 210 may refer to the linguistic structure 244 where words are written with information about display coordinates and a magnification level. The display information manager 210 may refer to the domain structure 245 where domains are written with information about display coordinates and a magnification level.

Alternatively, words and domains included in the current screen may be transferred directly from the controller 110 to the display information manager 210 and stored in association with the current screen in the display information manager 210. For example, for a dynamically varying object, like an abruptly appearing avatar, because the object is not fixed at a specific coordinate on a screen and cannot be designated by the linguistic structure 244 or domain structure 245, the controller 110 itself may transfer information of words and domains included in the current screen to the display information manager 210. Word information may include, for example, word IDs, word coordinates, and the like. The domain information may include domain IDs, domain area coordinates, and the like.

The display information history storage 241 may maintain display information at the time when a display variation signal is received. The display information history storage 241 may maintain display information based on display variation signals that are received over a predetermined time period. The display information history stored in the display information history storage 241 may be accessed and used by the word weight adjusting unit 222 and the domain weight adjusting unit 224.

The word weight adjusting unit 222 may set greater weights for words included in a current screen or adjacent screens that are temporally and/or spatially adjacent to the current screen, as opposed to words not belonging to the current or adjacent screens. The speech recognition engine 230 applies a language model that sets words with greater weights to have a higher recognition probability for speech recognition, thereby offering high speech recognition rate when a user utters the corresponding words.

The domain weight adjusting unit 224 may assign greater weights to valid domains in the current screen or adjacent screens that are temporally or spatially adjacent to the current screen as opposed to domains not included in the current or adjacent screens. The speech recognition engine 230 may apply a language model that sets domains with greater weights to have a higher recognition probability for speech recognition, thereby offering a high speech recognition rate when a user utters words belonging to the corresponding domains.

The speech recognition engine 230 may perform speech recognition using the language model in which word weights and domain weights adjusted by the word weight adjusting unit 222 and the domain weight adjusting unit 24 are reflected. The speech recognition engine 230 may output the results of the speech recognition. After completing speech recognition, the speech recognition engine 230 may transfer a speech recognition completion signal to the display information manager 210.

Figure 3:
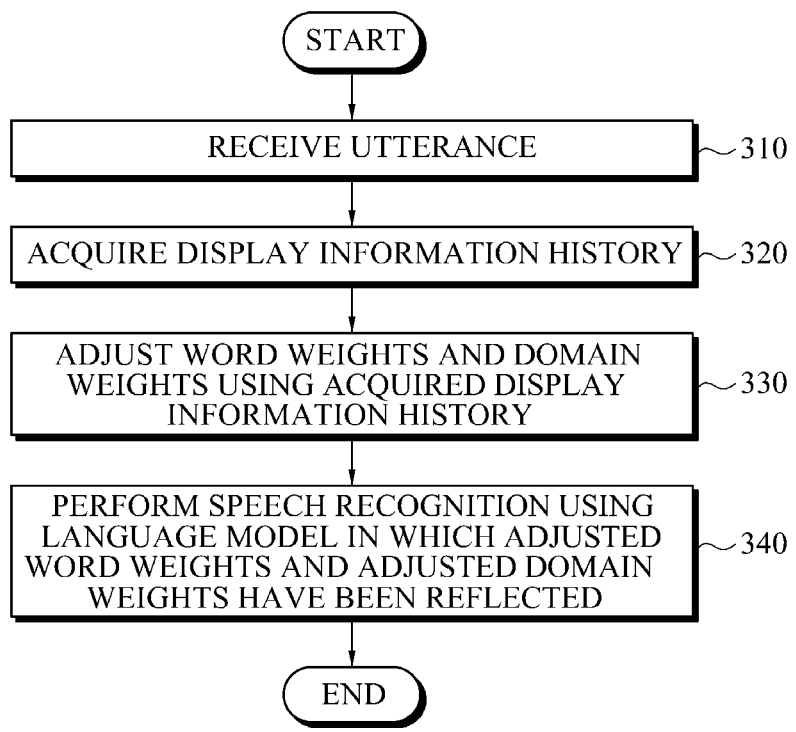
FIG. 3 is a flowchart illustrating an example of a speech recognition method.

FIG. 3 illustrates an example of a speech recognition method.

Referring to FIGS. 1-3, when an utterance is received in operation 310, the speech recognition engine 230 may acquire word weight information from the word weight adjusting unit 222 and domain weight information from the domain weight adjusting unit 224. In operation 320, the word weight adjusting unit 222 and the domain weight adjusting unit 224 may acquire a display information history.

In operation 330, the word weight adjusting unit 222 receives the display information history from the display information history storage, adjusts word weights, and stores the adjusted word weights in the word weight storage 242. Likewise, in operation 330 the domain weight adjusting unit 224 receives the display information history from the display information history storage, adjusts domain weights, and stores the adjusted domain weights in the domain weight storage 242.

In operation 340, the speech recognition engine 230 acquires the word weights from the word weight storage 242 and the domain weights from the domain weight storage 243, then performs speech recognition using a language model in which the word weights and the domain weights are reflected and outputs the result of the speech recognition to the controller 110.

The speech recognition language model may follow Equation 1 below.

$$(\hat{W}, \hat{n}) = \underset{w,n}{\operatorname{argmax}} P(0 \mid W) P^\lambda(W; d_n) \tag{1}$$

Equation 1 is used for multi-domain continuous-word speech recognition that outputs a word sequence W with the highest probability with respect to a given speech signal 0. In this example, P(0|W) refers to an acoustic model probability value, and $P^\lambda(W;d_n)$ refers to a language model probability value when a domain $d_n$ is put into consideration. Also, λ refers to a weight between an acoustic model matching score and a language model matching score, and n refers to a domain identifier.

Accordingly, Equation 1 may be used to extract a word sequence that has the highest probability in consideration of all weights for N domains stored in the domain weight storage 243, such that the word sequence and at least one domain to which the word sequence belongs may be outputted.

$$P(W; d_n) = \prod_{i=1}^{Q} P(w_i \mid \{w_k\}_{k=1}^{i-1}; d_n) \tag{2}$$

Equation 2 may be used to rewrite the word sequence W composed of words $w_1, w_2, \ldots, w_Q$, and illustrates that a language model probability value for the word sequence W may be obtained by multiplying the language model probabilities of individual words by each other.

$$P(w_i \mid \{w_k\}_{k=1}^{i-1}; d_n) = \tag{3}$$
$$P_{generalLM}^{1-\alpha-\beta_n}(w_i \mid \{w_k\}_{k=1}^{i-1}) P_{domainLM}^{\beta_n}(W_i \mid \{w_K\}_{k=1}^{i-1}; d_n) p_{wordLM}^{\alpha}(w_i)$$

Equation 3 may be used to calculate a language model score for each word. As shown in Equation 3, a dynamic language model may be established by interpolating three types of language models.

In Equation 3, $P_{generalLM}$ refers to a general language model that covers all domains, $P_{domainLM}$ refers to a language model for each domain stored in the domain weight storage 243, and $P_{wordLM}$ refers to a language model for each word based on word weight information. The language model $P_{generalLM}$ does not vary even when display variations occur, but the language models $P_{domainLM}$ and $P_{wordLM}$ may vary depending on display information.

Equation 4 expresses the relative magnitudes of a domain weight $\beta_0$ and N domain weights $\beta_1$-$\beta_N$ stored in the domain weight storage 243. That is, the domain weights $\beta_1$-$\beta_N$ represent weights for respective domains that are adjusted according to the display information and the display variation signal.

$$\beta_N > \ldots > \beta_1 > \beta_0 = 0, \alpha \leq 0 \quad (4)$$

$\beta_0$ corresponds to the example where no domain weight is applied.

Figure 4:
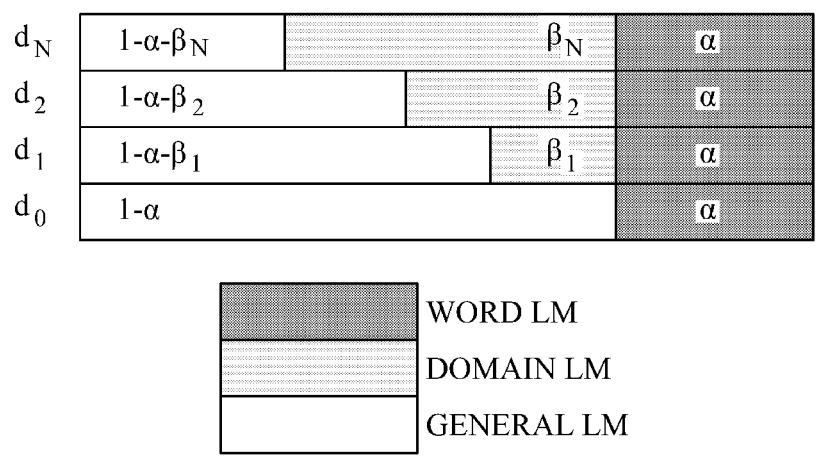
FIG. 4 is a table illustrating an example of language model weights that that may be used for interpolation of language models.

FIG. 4 illustrates an example of language model weights that may be used for interpolation of language models.

The sum of a general language model weight, a word language model weight $\alpha$, and a domain language model weight $\beta$, is 1. In a language model, a domain weight for a domain on a screen occupies a portion of $\beta_n$, a word language model weight $P_{wordLM}$ occupies a portion of $\alpha$ regardless of the domain, and a general language model weight $P_{generalLM}$ occupies the remaining portion. The $\alpha$ value changes with screen variations, however, unlike the $\beta$ value, the $\alpha$ value is not dependent on a domain when speech recognition is performed on a certain given screen. FIG. 4 illustrates combinations of general language model weights, word language model weights, and domain language model weights for domains $d_0$ through $d_N$.

The combination for $d_0$ is not stored in the domain weight storage 243, and is composed only of a general language model 1-$\alpha$ covering the entire domains without application of any other domain language model and the word language model weight $\alpha$. In other words, a domain weight $\beta_0$ for $d_0$ is zero.

Figure 5A:
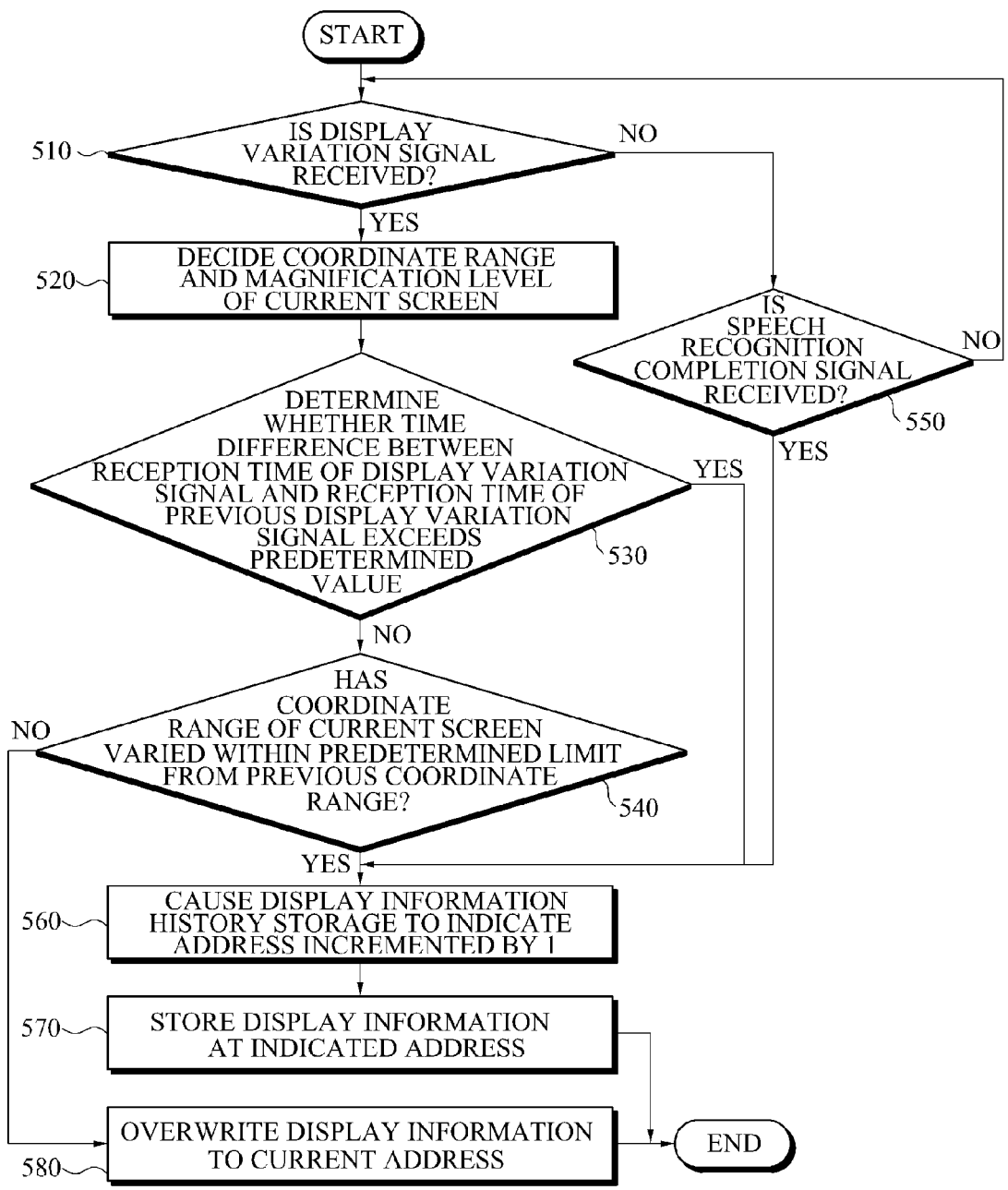
FIG. 5A is a flowchart illustrating an example of storing a display information history.

FIG. 5A illustrates an example of storing display information history.

Referring to FIGS. 1, 2 and 5A, the display information manager 210 may operate when receiving a display variation signal or a speech recognition completion signal. The controller 110 may transfer a display variation signal to the display information manager 210 when variations occur on a screen. The variations may occur for various reasons, for example, due to execution of applications or adjustment of screen settings, a user clicking on a specific part of a map to move the map, zooming to adjust screen magnification, appearance of an object moving dynamically, and the like. Accordingly, the controller 110 may further transfer information about words and domains related to the screen to the display information manager 210.

In operation 510, the display information manager 210 determines whether a display variation signal is received. If it is determined that a display variation signal has been received, in operation 520 the display information manager 210 decides a coordinate range and magnification level of a current screen for which the display variation signal has been generated. For example, the display information manager 210 may receive information about the coordinate range and magnification level of the current screen from the controller 110, along with the display variation signal.

In operation 530, the display information manager 210 calculates a difference between a time at which the display variation signal is received and a time at which the previous display variation signal is received, and determines whether the time difference exceeds a predetermined value. If the time difference exceeds a predetermined value, in operation 560, the display information manager 210 causes the display information history storage 241 to indicate an address incremented by 1 and then stores information about the current screen at the indicated address in operation 570.

If the time difference does not exceed the predetermined value, in operation 540 the display information manager 210 determines whether the coordinate range of the current screen has varied within a predetermined limit from the previous coordinate range. If it is determined that the coordinate range of the current screen has varied within the predetermined limit from the previous coordinate range, in operation 560 the display information manager 210 causes the display information history storage 241 to indicate an address incremented by 1 and then stores information about the current screen at the indicated address in operation 570.

Accordingly, display information of the previous screen may be maintained when the previous screen corresponding to the previous display variation signal is a valid screen showing little coordinate variations over time. If it is determined that the coordinate range of the current screen has varied beyond the predetermined limit from the previous coordinate range, in operation 580 the display information manager 210 may overwrite current display information to the current address.

Checking the degree of variation of the coordinate range allows display information about a screen of interest to be maintained. In some embodiments, a slowly varying screen may be considered as a screen of interest when a slow screen variation occurs such as simulated driving or when an avatar moves slowly in a virtual world. Consequently, for example, except for the case where a coordinate range of a screen is sharply varied in a short time, most screens may be considered as valid screens that are of interest to a user. For example, when a new object appears in the same coordinate range, the screen also may be considered as a valid screen.

FIG. 5B illustrates an example of stored display information history.

Referring to FIGS. 1, 2 and 5B, if a display variation signal is received when an address 1 is currently indicated by the display information history storage 241, the display information manager 210 may increment from address 1 to address 2. For example, if the time difference between the display variation signal and the previous display variation signal is greater than a time value time(1) recorded at the address 1, or if a difference between a coordinate range included in display information info(1) recorded at the address 1 and a current coordinate range is within a predetermined limit, the display information manager 210 may increment address 1 to an address 2. The display information manager 210 may store current display information info(2) and a time value time(2) of a time at which the current display variation signal has been received.

However, if the time difference between the currently received display variation signal and the previously received display variation signal is not greater than the time value time(1), or if the difference between the coordinate range included in the display information info(1) and the current coordinate range is not within the predetermined limit, the time value time(2) of the and the current display information info(2) may be stored at the address 1 so as to overwrite the existing display information.

Meanwhile, as illustrated in FIGS. 1 and 2, the speech recognition engine 230 transfers a speech recognition completion signal to the display information manager 210. Referring to FIGS. 2 and 5A, when receiving the speech recognition completion signal in operation 550, the display information manager 210 causes the display information history storage 241 to indicate an address incremented by 1 in operation 560 and stores current display information at the indicated address in operation 570. For example, if a speech recognition completion signal is received when the display information history storage 241 indicates an address 1, the display information manager 210 may cause the display information history storage 241 to indicate an address 2 incremented by 1 from the address 1, thus preventing display information recorded at the address 1 from being overwritten.

The considerations of a period of time during which no variation occurs in a screen, a variation degree of the coordinate range, and a determination on whether speech recognition has been performed, allow valid display information to be stored. That is, a user may remember a certain specific screen better than other screens when the screen is maintained for a long time, a coordinate range of the screen is little varied, or when speech recognition has been performed on the screen. Accordingly, there is high probability that a user may recognize details related to the corresponding screen. In some embodiments, the process may be performed under an assumption that a screen which is maintained only for a short time and in which a coordinate range sharply varies contains little or no memorable information.

Figure 6:
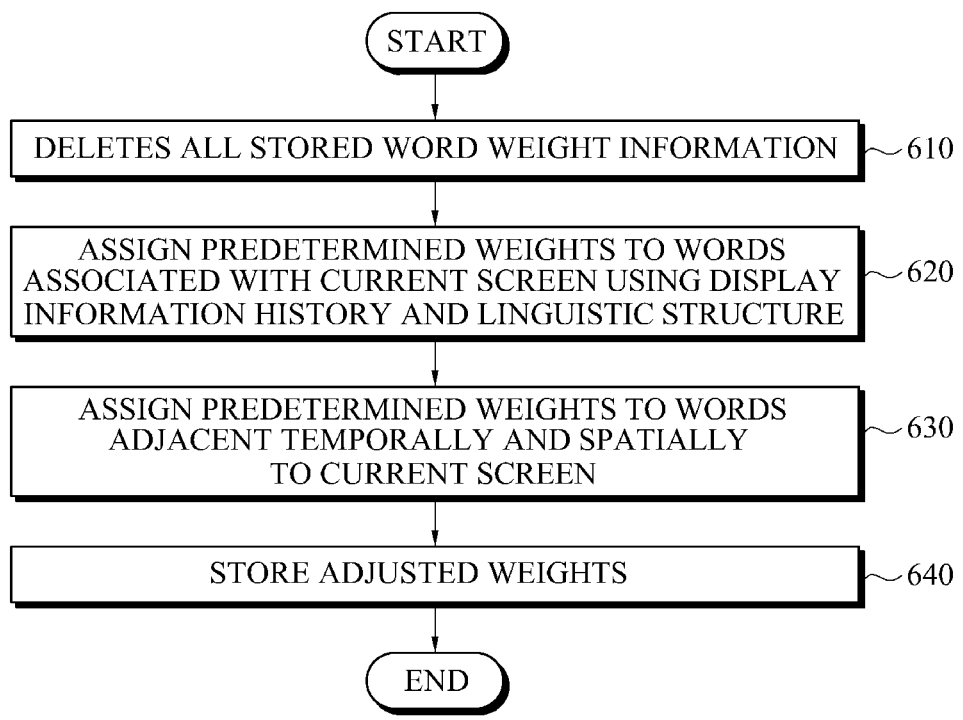
FIG. 6 is a flowchart illustrating an example of a method for adjusting word weights based on display information.

FIG. 6 illustrates an example of adjusting word weights based on display information.

The word weight adjusting unit 222 deletes word weights stored in the word weight storage 242 in operation 610. The deletion operation may be selectively performed according to the capacity of the word weight storage 242.

In operation 620, the word weight adjusting unit 222 assigns predetermined weights to words included in a current screen among a display information history. In addition, the word weight adjusting unit 222 assigns predetermined weights to words adjacent temporally and spatially to the current screen in operation 630.

As described herein, "words adjacent temporally to the current screen" indicates words obtained from the most recent display information. The most recent display information has been stored in the display information history storage 241, and the temporally adjacent words are assigned weights in the same method as when words of the current screen are assigned weights. However, in some embodiments, lower weights may be assigned to the older words.

As described herein, "words adjacent spatially to the current screen" indicates words belonging to an outer screen that is within a predetermined range from the current screen, or words belonging to screens that have magnifications higher or lower than a magnification of the current screen, within a predetermined limit. In some embodiments, the words adjacent spatially to the current screen may be assigned lower weights than those assigned to the words of the current screen.

When certain words that are to be assigned weights already have weights higher than weights to be assigned by the word weight adjusting unit 222, the word weight adjusting unit 222 may maintain the existing weights of the words.

The reason for assigning weights to words of adjacent screens is that there is a probability that a user will reach the current screen while looking around screens or adjusting a magnification because a user either previously viewed that screen or the screen is of a related topic. In operation 640, the word weights are stored in the word weight storage 242.

Figure 7A:
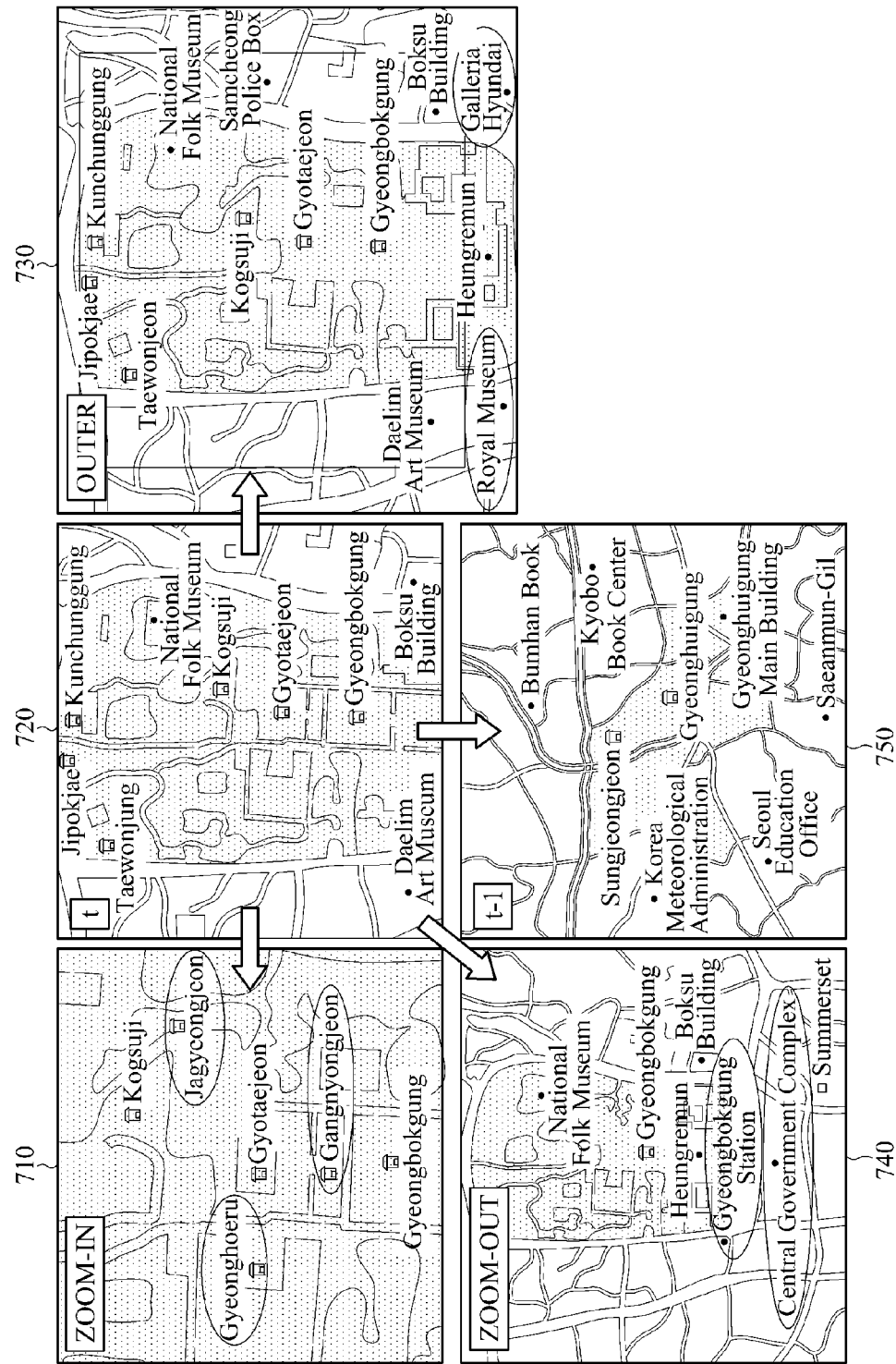
FIG. 7A is a diagram illustrating an example of adjusting word weights based on the display information history.

FIG. 7A illustrates an example of adjusting word weights based on the display information history.

FIG. 7B illustrates an example of words that are stored with adjusted word weights.

Referring to FIG. 7A, screen 750 is a screen that has been stored in the display information history storage 241 (see FIG. 2). The screen 750 may be stored when a user has taken a predetermined amount of time to stare at a screen or when the user has taken a predetermined amount of time to converse with the system while viewing the screen.

For example, if the user tries speech recognition for a screen 720 at a time t, as seen in a table of FIG. 7B, the word weight adjusting unit 222 (see FIG. 2) may delete the existing word weight information and assign the highest weight 0.5 to words (Gyeongbokgung, Gyotaejeon, and the like) which are displayed on the screen at the time t. In this example, 0.5 is given as the highest weight.

In some embodiments, the word weight adjusting unit 222 may assign weights to words adjacent temporally and spatially to the current screen 720. For example, in a temporal view, the word weight adjusting unit 222 may assign a weight of 0.4 to words such as Gyeonghuigung, Sungjeongjeon which are displayed on the screen 750 at the time t−1. If there are additional words on a screen at a time t−2, the word weight adjusting unit 222 may assign a weight of 0.3 to the additional words. In this example, the further away in time the screen is, the less weight is assigned to the words located on that screen.

As another example, in a spatial view, the word weight adjusting unit 222 may assign a weight to the adjacent words. Also, as seen in the table of FIG. 7B, a weight of 0.4 is assigned to words, such as Gyeonghoeru, Gang Nyongjeon, and the like, displayed on a zoomed-in screen 710 of the current screen 720, and the same weight of 0.4 to words such as Gyeongbokgung station, Central Government Complex, and the like, displayed on a zoomed-out screen 740 of the current screen 720. Also, the weight of 0.4 may be assigned to words such as Royal Museum, galleria Hyundai, and the like, of a screen 730 showing the outer areas of the current screen 720.

Figure 8:
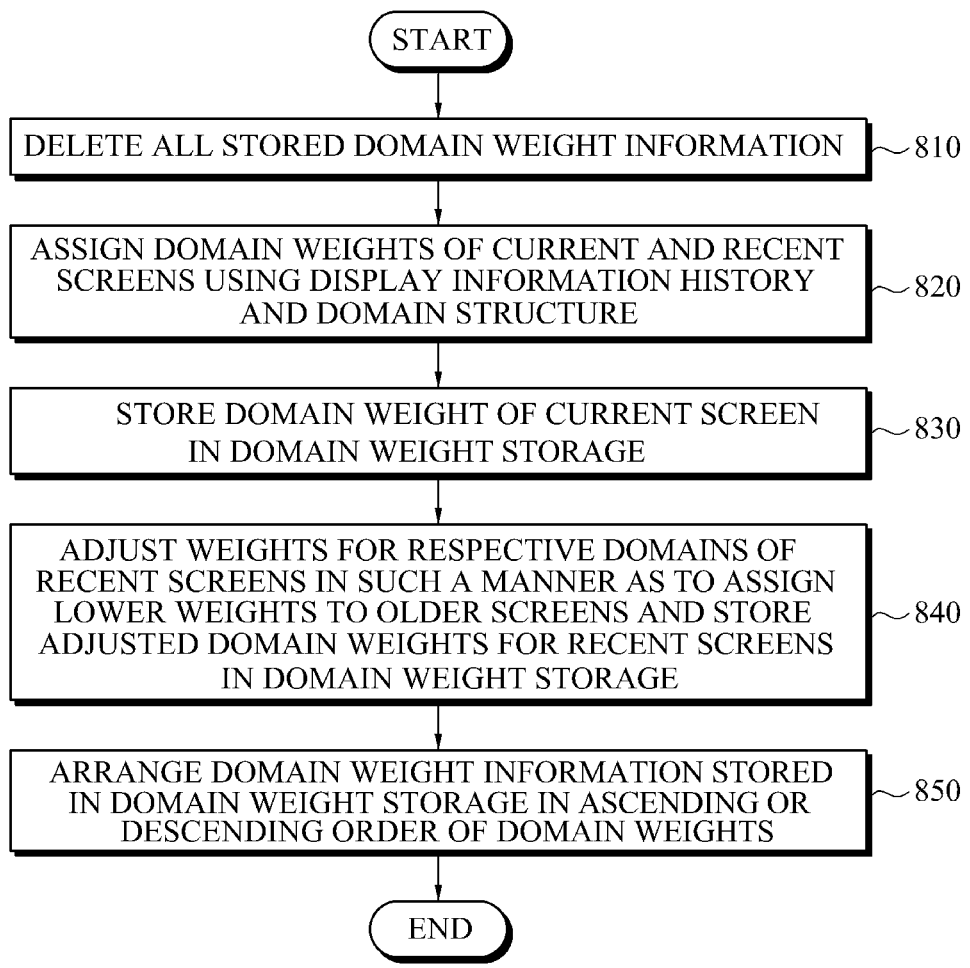
FIG. 8 is a flowchart illustrating an example of a method for adjusting domain weights based on a display information history.

FIG. 8 illustrates an example of a method for adjusting domain weights based on a display information history.

Referring to FIGS. 2 and 8, in operation 810 the domain weight adjusting unit 224 deletes all information stored in the domain weight storage 243. In some embodiments, the deletion operation may be performed selectively depending on the capacity of the domain weight storage 243.

In operation 820, the domain weight adjusting unit 224 assigns domain weights of the current and recent screens, similar to the operation of the word weight adjusting unit 222. Details of a method of deciding domain weights are described with reference to FIG. 9.

If the domain weights of current and recent screens are assigned based on display information of the respective screens, in operation 830 the domain weight adjusting unit 224 stores the domain weight of the current screen in the domain weight storage 243.

In operation 840, the domain weight adjusting unit 224 adjusts weights for the respective domains of the recent screens in such a manner as to assign the lower weights to the older screens, and stores the adjusted domain weights for the recent screens in the domain weight storage 243. In this example, overlapping domains among the current and recent screens may be stored in the domain weight storage 243 when the weights of the domains are greater than the previously stored weights of the domains.

After the domain weights of the current and recent screens are stored in the domain weight storage 243, in operation 850 the domain weight adjusting unit 224 may arrange the domain weight information stored in the domain weight storage 243 in an ascending or descending order based on the weights. The operation of arranging the domain weight information stored in the domain weight storage 243 in an ascending or descending order of the domain weights may be selectively performed.

Figure 9:
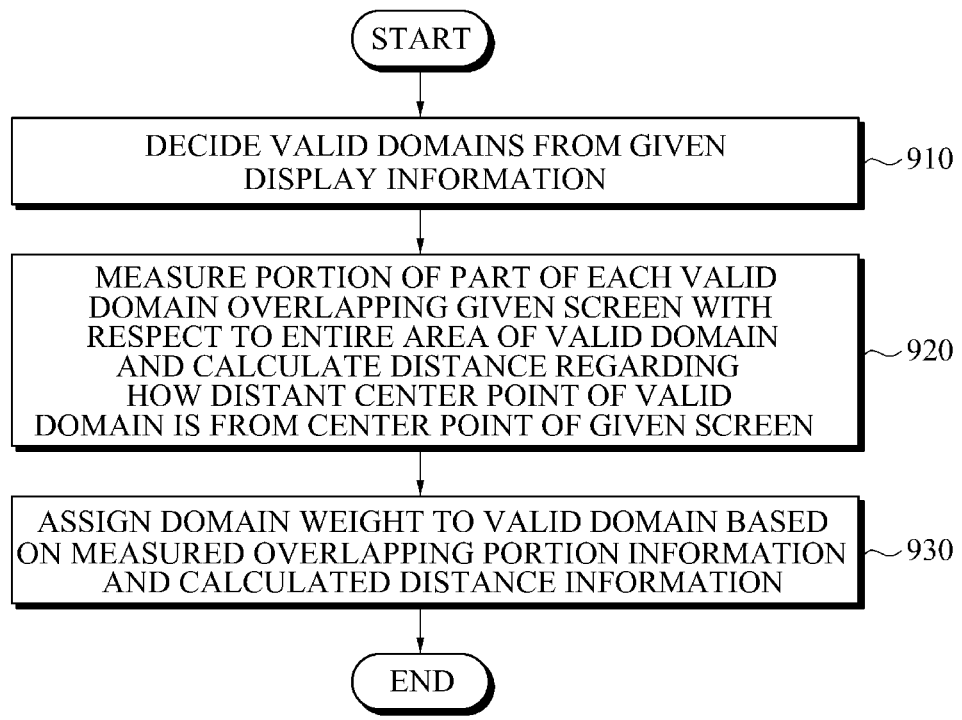
FIG. 9 is a flowchart illustrating an example of a method for adjusting domain weights based on a respective display.

FIG. 9 illustrates an example of a method for adjusting domain weights based on a respective display.

The operation 820 of assigning weights to the domains of the current and recent screens, as shown in FIG. 8, may be performed according to the method shown in FIG. 9. The domain weight adjusting unit 224 may decide weights for domains of a screen under an assumption that domains closer to the center of the screen are of more concern to a user.

Referring to FIG. 9, in operation 910 the domain weight adjusting unit 224 (see FIG. 2) decides valid domains from a given screen such as a current or recent screen. For example, the valid domains may be domains of regions, which overlap the given screen.

In operation 920, the domain weight adjusting unit 224 measures a portion of each valid domain overlapping the given screen with respect to the entire area of the valid domain, and calculates a distance from the center point of the valid domain to the center point of the given screen.

In operation 930, the domain weight adjusting unit 224 assigns a domain weight to the valid domain based on the measured portion information and the calculated distance information.

In order to perform the operation 930, the domain weight adjusting unit 224 may arrange the valid domains in ascending order of the measured portions of the valid domains. The domain weight adjusting unit 224 may arrange valid domains based on their distance information. For example, the domains may be arranged in a descending order based on the distance from the center point of the domain to the center point of the given screen.

The domain weight adjusting unit 224 may assign the higher weights to the later domains in the arrangement order of the domains. That is, the domain weight adjusting unit 224 may assign higher weights to domains arranged later in the arrangement order under an assumption that the domains arranged later are of more concern to a user. Accordingly, the domain weight adjusting unit 224 allows for a faster recognition rate and a faster response speed when a user produces an utterance in association with one of the corresponding domains.

Figure 10A:
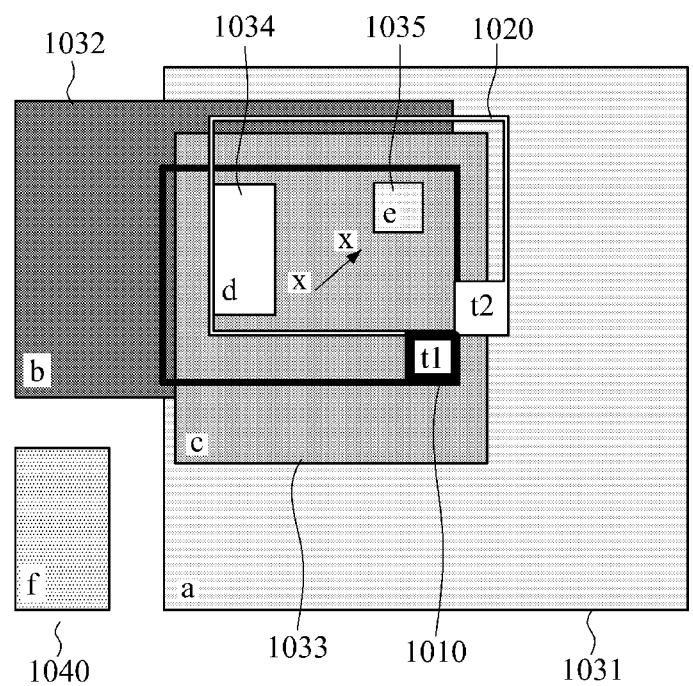
FIG. 10A is a diagram illustrating an example of domains overlapping each other on displays that vary over time.

FIG. 10A illustrates an example of domains overlapping each other on displays that vary over time.

Figure 10B:
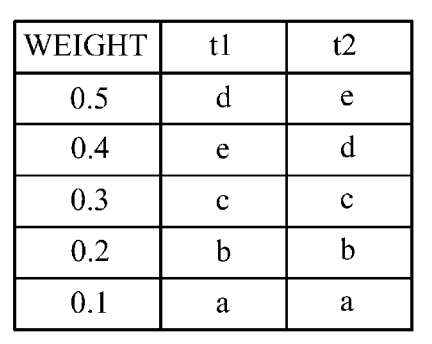

FIG. 10B illustrates an example of domain weights with respect to displays. The domain weights may be adjusted and stored in a domain weight storage according to the portions of the domains.

Referring to FIG. 10A, box 1010 corresponds to a screen at a time t1, and box 1020 corresponds to a screen at a time t2. The screen 1010 at the time t1 and the screen 1020 at the time t2 include a valid domain a (1031), a valid domain b (1032), a valid domain c (1033), a valid domain d (1034), and a valid domain e (1035). In this example, domain f (1040) is not a valid domain for both the screens 1010 and 1020.

In both the screens 1010 and 1020, the portions of the respective domains are a<b<c<d<e=100%. For example, both the d domain 1034 and the e domain 1035 have a portion of 100%, the d domain 1034 is closer to the center of the screen 1010 at the time t1, and the e domain 1035 is closer to the center of the screen 1020 at the time t2. In this example, the screen moves from near the d domain 1034 to near the e domain 1035 over time. The screen may move as a user's concern has moved.

An example of information stored in the domain weight storage 243 at the two times t1 and t2 is illustrated in the table of FIG. 10B.

Referring to FIG. 10B, at the time t1, the d domain 1034 is assigned the highest weight, and at the time t2, the e domain 1035 is assigned the highest weight. The absolute values of domain weights may be adjusted for optimization while maintaining the relative differences between the domain weights.

For example, the a domain may illustrate the city of Rome, the c domain may illustrate the Colosseum, the d domain may illustrate the gladiator, and the e domain may illustrate the emperor Nero. Accordingly, and the domains a, c, d and e each have respective language models.

For example, at the time t1 the gladiator is positioned in the center of the screen 1010, and in the screen 1020 at the time t2 the emperor Nero is positioned in the center of the screen 1020. Accordingly, it may be determined that a user's view has moved from the gladiator to the emperor Nero. That is, in the screen 1010 at the time t1, the "gladiator" domain is assigned the highest weight, and in the screen 1020 at the time t2, the "emperor" domain is assigned the highest weight. In both the screens 1010 and 1020, the "Rome" and "Colosseum" domains may be assigned weights that are lower than those assigned to the "gladiator" and "emperor" domains but higher than weights assigned to the remaining domains.

Figure 11A:
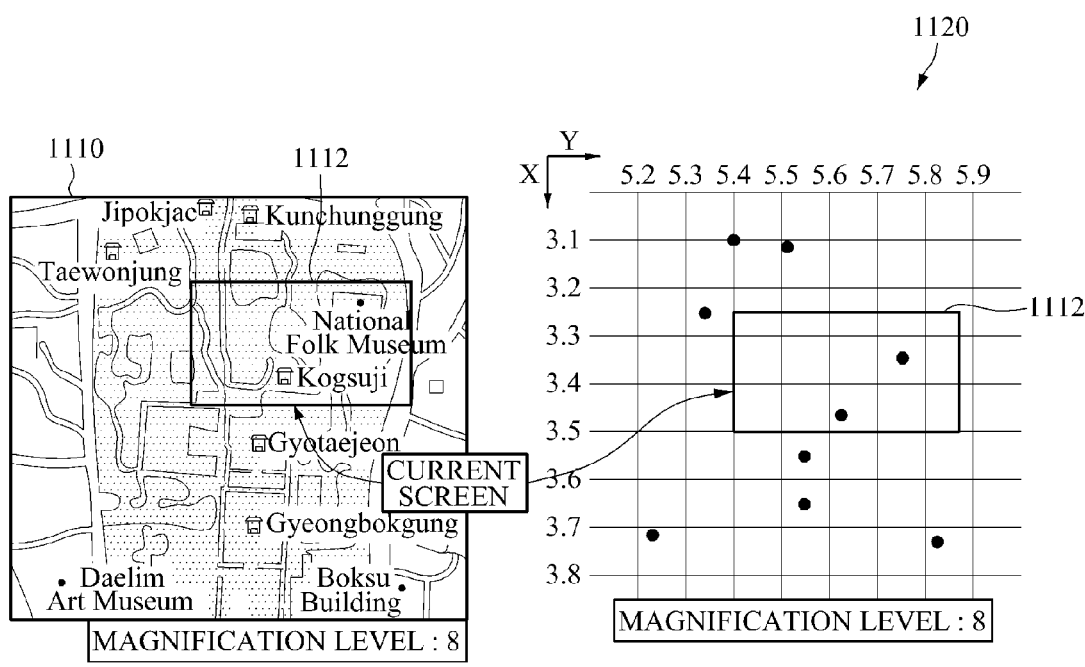

FIGS. 11A and 11B illustrate examples of a linguistic structure.

A linguistic structure may be stored after calculating coordinate values on a map of each object. The linguistic structure may be calculated according to magnifications and the arrangement of the coordinate values of objects along with the objects' IDs in magnitude order for each magnification. Referring to FIG. 11A, coordinates on a map of the screen 1010 are represented by x and y coordinate values. For example, the coordinates on the map of the screen 1010 may be stored sequentially in a magnitude order of x coordinate values and in magnitude order of y coordinate values. Accordingly, when words included in a specific screen are searched for, the searching may be carried out by first comparing x coordinates and then comparing y coordinates, and vice versa.

In some embodiments, a linguistic structure may be stored after configuring different pieces of word information according to magnifications so that words to be displayed on a screen depend on a magnification selected by a user. For example, the detailed names of places such as street names may be displayed at high magnification and may not be displayed at low magnification. In this example, map screen 1120 with a magnification level 8 is shown in the right side of FIG. 11A. Map screen 1120 shows items of interest from a screen 1110 displaying a real map at certain coordinates.

FIG. 11B is a table representing an example linguistic structure for the screen 1110.

In the example of FIG. 11B, for convenience of description, word IDs are represented by the names of the words themselves, but in an actual implementation, the words IDs may be represented by numbers. When a box 1112 (see FIG. 11A) is a current screen, the coordinates of the current screen may be (3.25, 5.40) and (3.5, 5.85) and words belonging to the current screens are "National Folk Museum" corresponding to a number 25 and "Kogsuji" corresponding to a number 26.

Figure 12A:
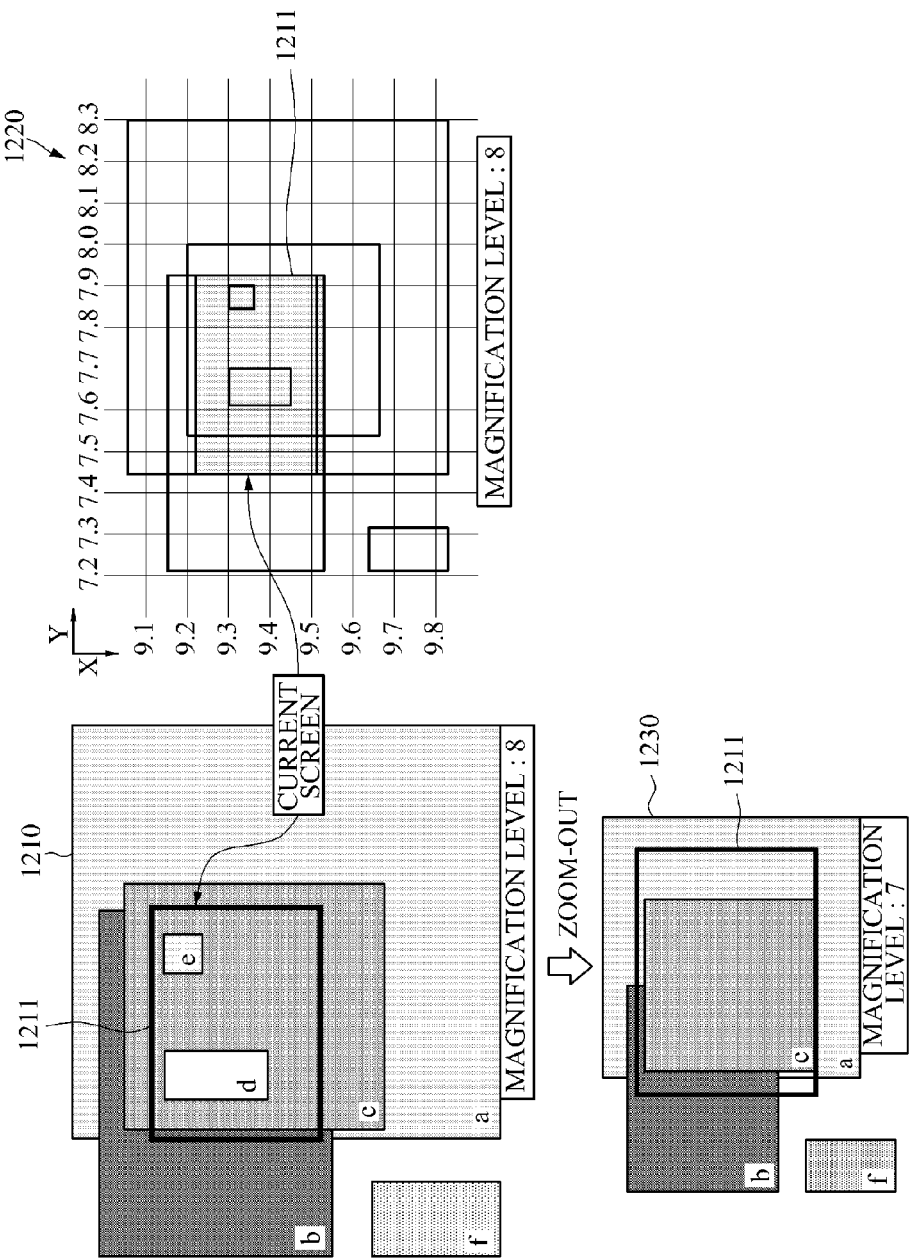

FIGS. 12A and 12B illustrate examples of a domain structure.

A domain structure may be configured and stored in the similar way to the linguistic structure. For example, a domain structure may be configured by storing coordinates on a map of individual domains along with domain IDs in magnitude order of the coordinates for each magnification.

Because a word may be represented by a coordinate point but a domain is an area, a domain should be represented by two coordinate points of UpperLeft (UL) and LowerRight (LR). Accordingly, the coordinates on a map of individual domains may be stored sequentially in a magnitude order of x coordinates of UL, in a magnitude order of y coordinates of UL, in a magnitude order of x coordinates of LR and in a magnitude order of y coordinates of LR. Accordingly, when valid domains are searched for from a certain screen, the searching may be carried out by comparing the x and y coordinates of domain UL or LR with x and y coordinates of UL or LR of the screen. If UL or LR of a domain is higher and more left than the LR of the screen and lower and more right than the UL of the screen, the domain is determined to be valid.

The determination on whether each domain is valid depends on a magnification selected by a user. Accordingly, domain information may be configured individually for each magnification.

Referring to FIG. 12A, screen 1210 has a magnification level 8 and a screen 1220 is a screen where a domain map corresponding to the screen 1210 is represented by coordinates. Screen 1230 shows a domain map zoomed out to the lower magnification from the domain map corresponding to the screen 1210.

Box 1211 corresponds to the current screen and has UL and LR coordinates of (9.22, 7.45) and (9.52, 7.93). In the current screen, valid domains overlapping the current screen, are domains a, b, c, d and e at the magnification level 8 whereas at the magnification level 7, valid domains are domains a, b and c. That is, the domains d and e are determined to be invalid at the lower magnification. As such, because available domain information varies according to magnification, domain information may be stored individually for each magnification.

FIG. 12B shows a domain structure that is expressed in a table format. In FIG. 12B, for convenience of description, word IDs are represented by the names of the words themselves, but in an actual implementation, the words IDs may be represented by numbers.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable labtop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A speech recognition apparatus, comprising:
a display device configured to display data on a screen;
a controller configured to generate a display variation signal indicating that variations have occurred on a screen, and create display information about the varied screen; and
a speech recognizer configured to adjust a word weight for at least one word related to the varied screen and a domain weight for at least one domain included in the varied screen, according to the display variation signal and the display information, and perform speech recognition using a dynamic language model in which the adjusted word weight and the adjusted domain weight are reflected,
wherein the speech recognizer comprises a weight adjusting unit configured to
adjust word weights and domain weights according to variations of the display information, and
assign a greater domain weight to at least one domain having a greater portion overlapping a current screen and at least one domain having a shorter distance to a center of the current screen.

2. The speech recognition apparatus of claim 1, wherein the controller is further configured to generate the display variation signal in response to a user input signal.

3. The speech recognition apparatus of claim 2, wherein the user input signal is generated by at least one of cursor movement, magnification adjustment, and screen rotation.

4. The speech recognition apparatus of claim 1, wherein the controller is further configured to generate the display variation signal when a moving object appears on the varied screen.

5. The speech recognition apparatus of claim 1, wherein the speech recognizer is further configured to perform the speech recognition using a language model where greater word weights and greater domain weights are respectively assigned to words and domains associated with the current screen.

6. The speech recognition apparatus of claim 1, wherein the speech recognizer is further configured to:
recognize the at least one word related to the varied screen using a linguistic structure that provides at least one associated word according to coordinates and magnifications of screens;
recognize the at least one domain included in the varied screen using a domain structure configured to provide at least one associated domain according to coordinates and magnifications of screens; and
adjust the word weight for the at least one word and the domain weight for the at least one domain.

7. The speech recognition apparatus of claim 1, wherein the display information about the varied screen comprises at least one of a coordinate range of the varied screen, a magnification level, a word related to the varied screen, and a domain belonging to the varied screen.

8. The speech recognition apparatus of claim 1, wherein the speech recognizer further comprises:
a display information manager configured to manage the storage of display information that varies over time; and
a speech recognition engine configured to acquire the adjusted word weights and the adjusted domain weights when an utterance is input, and perform speech recognition using a language model generated dynamically according to the acquired word weights and the acquired domain weights.

9. The speech recognition apparatus of claim 8, wherein the display information manager is further configured to determine whether or not to store the display information based on at least one of a difference between a time at which the display variation signal has been received and a time at which the previous display variation signal has been received, variations in coordinate range between the current screen and the previous screen, and whether or not speech recognition has been performed on a screen.

10. The speech recognition apparatus of claim 8, wherein the weight adjusting unit is further configured to assign a greater word weight to at least one word included in the current screen and screens adjacent temporally and spatially to the current screen in comparison to words that are not included in the current screen and the adjacent screens.

11. The speech recognition apparatus of claim 8, wherein the weight adjusting unit is further configured to:
assign a greater domain weight to at least one domain included in the current screen and screens adjacent temporally and spatially to the current screen in comparison to domains not included in the current screen and the adjacent screens.

12. The speech recognition apparatus of claim 1, wherein the dynamic language model is calculated by interpolating a general language model that covers all domains, a domain language model defined for each domain, and a word language model in which word weight information is reflected.

13. A speech recognition method, comprising:
generating a display variation signal indicating that variations have occurred on a screen and creating display information about the varied screen;
adjusting a word weight for at least one word related to the varied screen and a domain weight for at least one domain included in the varied screen, according to the display variation signal and the display information; and
performing speech recognition using a dynamic language model in which the adjusted word weight and the adjusted domain weight are reflected,
wherein the adjusting of the word weight comprises
assigning a greater domain weight to at least one domain having a greater portion overlapping a current screen and at least one domain having a shorter distance to a center of the current screen.

14. The speech recognition method of claim 13, wherein the display variation signal is generated in response to a user input signal.

15. The speech recognition method of claim 14, wherein the user input signal is generated by at least one of cursor movement, magnification adjustment, and screen rotation.

16. The speech recognition method of claim 13, wherein the display variation signal is generated when a dynamically moving object appears on the varied screen.

17. The speech recognition method of claim 13, wherein the performing of the speech recognition comprises performing the speech recognition using a language model where greater word weights and greater domain weights are respectively assigned to words and domains associated with the current screen.

18. The speech recognition method of claim 13, wherein the adjusting of the word weight comprises assigning a greater word weight to at least one word included in the current screen and screens adjacent temporally and/or spatially to the current screen in comparison to words that are not included in the current screen and the adjacent screens.

19. The speech recognition method of claim 13, wherein the adjusting of the word weight further comprises:
assigning a greater domain weight to at least one domain included in the current screen and screens adjacent temporally and spatially to the current screen in comparison to domains not included in the current screen and the adjacent screens.

20. The speech recognition method of claim 13, wherein the dynamic language model is calculated by interpolating a general language model that covers all domains, a domain language model defined for each domain, and a word language model in which word weight information is reflected.

21. A speech recognition apparatus, comprising:
a display device configured to display words on a screen; and
a speech recognizer configured to perform speech recognition using a dynamic language model, and to dynamically adjust the dynamic language model such that words currently displayed on the screen have an increased probability of being recognized as speech when subsequently receiving an utterance from a user,
wherein the speech recognizer comprises a weight adjusting unit configured to
adjust word weights and domain weights according to variations of display information, and
assign a greater domain weight to at least one domain having a greater portion overlapping a current screen and at least one domain having a shorter distance to a center of the current screen.

* * * * *